United States Patent
Nguyen

(10) Patent No.: US 7,283,643 B2
(45) Date of Patent: *Oct. 16, 2007

(54) DETERMINATION OF A SEGMENTATION OF A DIGITAL SIGNAL FOR INSERTING WATERMARKING SIGNALS AND THE ASSOCIATED INSERTION

(75) Inventor: Eric Nguyen, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 348 days.

This patent is subject to a terminal disclaimer.

(21) Appl. No.: 10/919,360

(22) Filed: Aug. 17, 2004

(65) Prior Publication Data
US 2005/0018876 A1 Jan. 27, 2005

Related U.S. Application Data

(62) Division of application No. 09/755,069, filed on Jan. 8, 2001, now Pat. No. 6,819,774.

(30) Foreign Application Priority Data

Jan. 11, 2000 (FR) .................................. 00 00286

(51) Int. Cl.
*G06K 9/00* (2006.01)
(52) U.S. Cl. ..................................... 382/100; 382/276
(58) Field of Classification Search ................ 382/100, 382/164, 171, 173, 177, 179, 232, 240, 276; 713/176, 179; 370/522–529; 380/51, 54, 380/201, 210, 252, 287; 283/72, 74, 81, 283/85, 93, 113, 901, 902; 348/461, 463; 375/130; 725/20, 22
See application file for complete search history.

(56) References Cited

U.S. PATENT DOCUMENTS

| | | | |
|---|---|---|---|
| 5,889,868 A * | 3/1999 | Moskowitz et al. ........ | 713/176 |
| 5,915,027 A * | 6/1999 | Cox et al. .................... | 380/54 |
| 6,272,634 B1 * | 8/2001 | Tewfik et al. ............... | 713/176 |
| 6,301,368 B1 | 10/2001 | Bolle et al. ................. | 382/100 |

(Continued)

OTHER PUBLICATIONS

Kutter, E.A., "Towards Second Generation Watermarking Schemes", Proceedings Of 6th International Conference On Image Processing, Oct. 24-28, 1999, pp. 320-323.

(Continued)

*Primary Examiner*—Samir Ahmed
*Assistant Examiner*—Abolfazl Tabatabai
(74) *Attorney, Agent, or Firm*—Fitzpatrick, Cella, Harper & Scinto

(57) ABSTRACT

The invention is a method for determining a segmentation into distinct regions of a set of coefficients representing at least part of an image in order to insert or extract a set of watermarking signals with a predetermined cardinal. The method of the invention generates a set of acceptable segmentations, calculates, for each acceptable segmentation, a probability of error on the detection of the watermarking signals inserted in said each acceptable segmentation, and selects at least a segmentation in the set of acceptable segmentations, on consideration of the probability of error subject to a constraint on the number of regions of the selected segmentation, with respect to said predetermined cardinal.

20 Claims, 10 Drawing Sheets

U.S. PATENT DOCUMENTS

Figure 1:
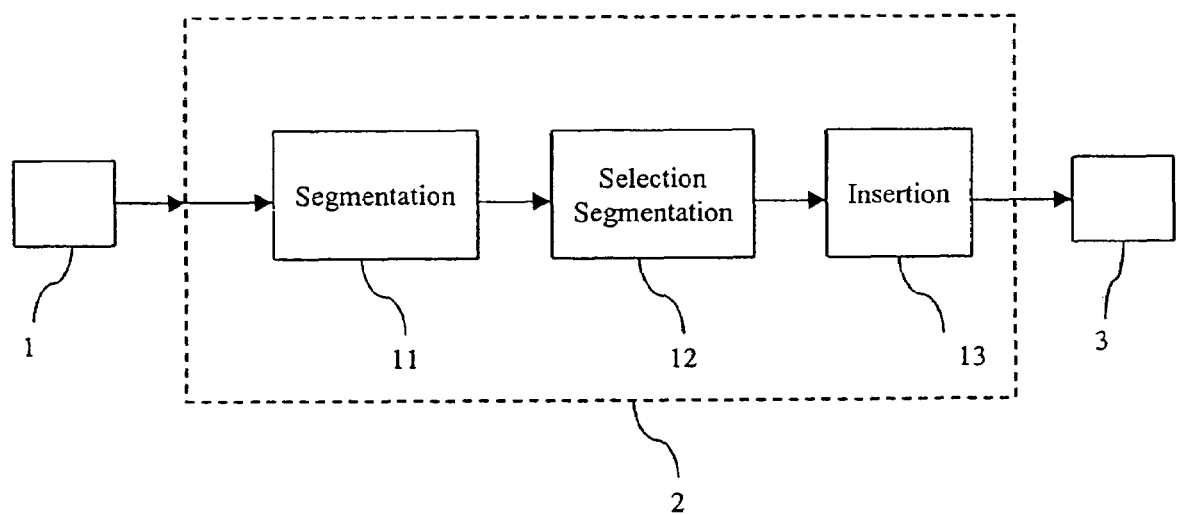

| | | | |
|---|---|---|---|
| 6,311,214 B1 | 10/2001 | Rhoads | 709/217 |
| 6,366,959 B1 | 4/2002 | Sidhu et al. | 709/231 |
| 6,373,974 B2 * | 4/2002 | Zeng | 382/135 |
| 6,532,307 B1 | 3/2003 | Sato | 382/240 |

OTHER PUBLICATIONS

Hernandez, J.R. et al., "Statistical Analysis Of Watermarking Schemes For Copyright Protection Of Images" Proceedings Of The IEEE, vol. 87, No. 7, Jul. 1999, pp. 1142-1166.

* cited by examiner

DETERMINATION OF A SEGMENTATION OF A DIGITAL SIGNAL FOR INSERTING WATERMARKING SIGNALS AND THE ASSOCIATED INSERTION

This application is a division of application Ser. No. 09/755,069, filed Jan. 8, 2001, now U.S. Pat. No. 6,819,774.

The present invention concerns a method of determining a segmentation of a set of coefficients representing at least part of a digital image in order to insert and extract a set of watermarking signals, and an associated method of inserting and extracting these watermarking signals.

Correlatively it concerns a device for determining a segmentation of a set of coefficients representing at least part of a digital image in order to insert and extract a set of watermarking signals and an associated device for inserting and extracting these watermarking signals.

The present invention lies in general terms in the technical field of watermarking of digital images, more particularly fixed images.

Watermarking digital data makes it possible to protect these data, for example by associating copyright information therewith, or conveying added value data, such as metadata.

In its general principle, watermarking consists of inserting an indelible watermark in digital data, similar to the encoding of additional information in the data.

The decoding of this additional information makes it possible, for example, to check the copyright information inserted.

This inserted watermark must consequently be at the same time imperceptible, robust to certain distortions applied to the digital image and capable of reliable detection.

In a conventional fashion, a usual technique of inserting a watermarking signal in a digital image consists of using a modulation model in which at least one subset of coefficients representing the digital image is modulated according to this model using a weighting coefficient.

Denoting a set of coefficients representing at least part of a digital image as $X=\{X_i, 1 \leq i \leq N\}$ and a watermarking signal of size $P \leq N$ as $w=\{w_j, 1 \leq j \leq P\}$, a pseudo-random signal of known distribution and null mean, the insertion formula is:

$$X'_j = X_j + b \cdot \alpha_j \cdot w_j, \text{ with } 1 \leq j \leq P,$$

in which $\{X_j, 1 \leq j \leq P\}$ is a subset of the set of coefficients X, b is an information bit, and $\alpha_j$ is a weighting coefficient, also referred to as modulation amplitude.

Detection of the watermarking signal then consists of detecting whether or not the pseudo-random sequence w has been inserted in a set of coefficients. This detection is carried out without using the original image and can be based on a standardised statistical test which makes it possible to calculate a probability of detection.

Such an insertion technique makes it possible, by inserting a watermarking signal, to insert a single information bit since the response of the detector is binary (yes/no). Typically, in order to insert a binary signal, either b=1 or b=−1 is used, depending on whether the value of the bit to be inserted is zero or one.

In order to insert a larger number of information bits in the digital image, in particular when a code of C bits indicating for example the name or address of the owner or author of the image is required, it is necessary to reiterate the insertion method described previously as many times as there are information bits to be inserted.

In other words, it is necessary to choose C subsets of coefficients and effect the modulation of these subsets by choosing C watermarking signals.

Preferably distinct subsets of coefficients are chosen so that the modulations are not superimposed on each other, which could interfere with the detection or cause unwanted visual effects.

It is consequently a question of choosing a partitioning of the coefficients representing the digital image into C distinct subsets, each carrying an information bit.

Methods are known for the arbitrary partitioning of the set of coefficients, into blocks, independently of the content of the digital image.

However, the content of the images is not spatially homogeneous, which gives rise to unequal probabilities of detection for the detected bits, and consequently a probability of global error on the inserted message which cannot be minimal. It is therefore advantageous to determine a partitioning which is adapted to the image. In this case, if it is wished to insert a predetermined number C of watermarking bits, it is also necessary to minimise a probability of error at the time of extraction of the watermarking signals.

The purpose of the present invention is to propose a method of determining a partitioning of the signal to be watermarked, whilst minimising a probability of error in the detection of the predetermined number of watermarking signals.

To this end, the invention proposes a method of determining a segmentation into distinct regions of a set of coefficients representing at least part of an image in order to insert a set of watermarking signals with a predetermined cardinal, characterised in that it includes the steps of:
  generating a set of acceptable segmentations,
  calculating, for each acceptable segmentation, a probability of error on the detection of the watermarking signals inserted in said each acceptable segmentation, and
  selecting a segmentation in the set of acceptable segmentations, by minimising, on all the acceptable segmentations, the probability of error subject to a constraint on the cardinal of the regions of the selected segmentation, with respect to the cardinal of said set of watermarking signals.

It is thus possible to effect a segmentation of a set of coefficients into distinct regions, effecting adaptive partitioning which minimises a probability of error in the detection of the predetermined number of watermarking signals.

According to a preferred characteristic of the invention, said set of coefficients is a set of transformed coefficients issuing from a spatial-frequency transformation of a digital image. This type of transformation is frequently used in image processing.

According to another preferred characteristic of the invention, the acceptable segmentations are obtained by arborescent segmentation of the coefficients representing at least part of an image.

According to a preferred characteristic of the invention, the acceptable segmentations are obtained by segmenting into a quaternary tree the coefficients representing at least part of an image.

This implementation is rapid and has low calculation complexity.

According to a preferred characteristic of the invention, each of the watermarking signals is associated with a watermarking bit and the probability of error on the detection of the watermarking signals is the probability of making at least one error on a bit during the detection of the watermarking bits.

According to a preferred characteristic of the invention, the minimisation of the probability of error includes a maximisation of a separable quantity and the selected segmentation is obtained by pruning an arborescent segmentation.

According to a preferred characteristic of the invention, the constraint of the optimisation step is that the cardinal of the regions of the selected segmentation is greater than or equal to the cardinal of said set of watermarking signals.

According to a preferred characteristic of the invention the method of determining a segmentation comprises a step of applying a distortion to the set of coefficients, before the step of generating a set of acceptable segmentations.

In this embodiment, the method comprises more precisely the steps of:
  generation of a centred pseudo-random sequence (w) equal in size to the cardinal number of the said set of coefficients, formed from centred pseudo-random subsequences;
  modulation) of the said set of coefficients by the said centred pseudo-random sequence in order to insert the same information bit on the said set of coefficients; and
  applying a distortion to the set of coefficients, before the step of generating a set of acceptable segmentations.

This embodiment allows to enhance the robustness of an inserted watermark, against some post-processing undergone by the image.

According to a preferred characteristic of the invention, the method also includes the display of the probability of error on all the watermarking signals.

This probability of error indicates the robustness of the insertion of the watermarking signals.

The invention also concerns a method of inserting, in a digital image, watermarking signals respectively associated with watermarking bits, characterised in that it includes a method of determining a segmentation as previously presented, and a step of inserting the watermarking bits by modulation of the coefficients of respective regions of the segmentation.

According to a preferred characteristic of the invention, the regions are considered in a predetermined order during the insertion step.

The invention also relates to a method of extracting from a digital image watermarking signals respectively associated with watermarking bits, characterised in that it includes a step of determining a segmentation as previously presented, and a step of extracting watermarking bits.

Correlatively, the invention relates to a device for determining a segmentation into distinct regions of a set of coefficients representing at least part of an image in order to insert a set of watermarking signals with a predetermined cardinal, characterised in that it has:
  means of generating a set of acceptable segmentations,
  means of calculating, for each acceptable segmentation, a probability of error on the detection of the watermarking signals inserted in said each acceptable segmentation, and
  means of selecting a segmentation in the set of acceptable segmentations, by minimising, on all the acceptable segmentations, the probability of error subject to a constraint on the cardinal of the regions of the selected segmentation, with respect to the cardinal of said set of watermarking signals.

The invention also concerns a device for inserting in a digital image watermarking signals respectively associated with watermarking bits, characterised in that it includes a device for determining a segmentation as previously presented, and means of inserting watermarking bits by modulating the coefficients of respective regions of the segmentation.

According to a preferred characteristic of the invention, the insertion means are adapted to consider the regions in a predetermined order.

The invention also concerns a device for extracting, from a digital image, watermarking signals respectively associated with watermarking bits, previously presented, and means of extracting watermarking bits.

The determination, insertion and extraction devices have means for implementing the characteristics previously presented.

The present invention also concerns a computer, a digital image processing apparatus, a digital printer, a scanner, a digital photographic apparatus and a digital camera adapted to implement the method of determining a partitioning and the insertion method according to the invention and/or comprising a device for determining a partitioning or an insertion device according to the invention.

These devices for determining a partitioning, for inserting and for extracting, this computer, this scanner, this digital photographic apparatus and this digital camera have characteristics and advantages similar to those described with reference to the methods of determining a partitioning and inserting which they implement.

A storage means or information carrier, which can be read by a computer or a microprocessor, incorporated or not into the latter, possibly removable, comprises portions of software codes or program instructions adapted to implement the steps of the method of determining a partitioning or insertion according to the invention, when said storage means or information carrier is implemented by a microprocessor or computer.

Figure 2:
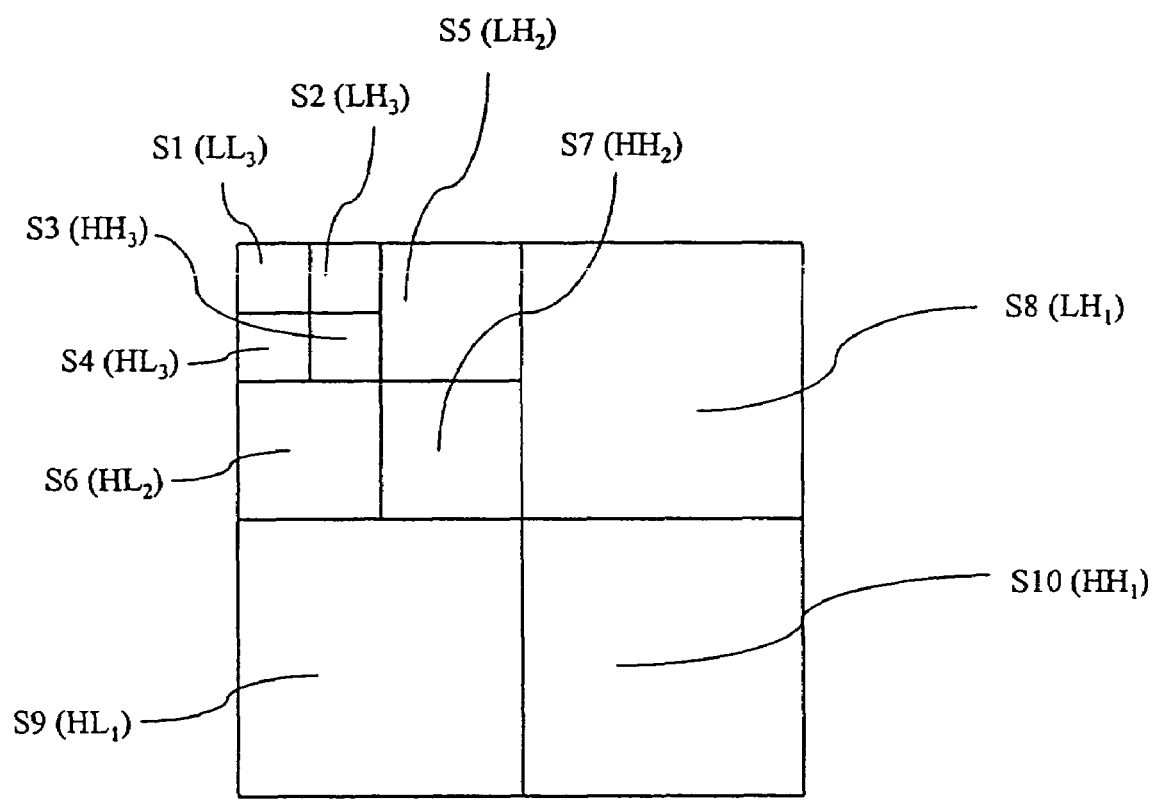
Figure 3:
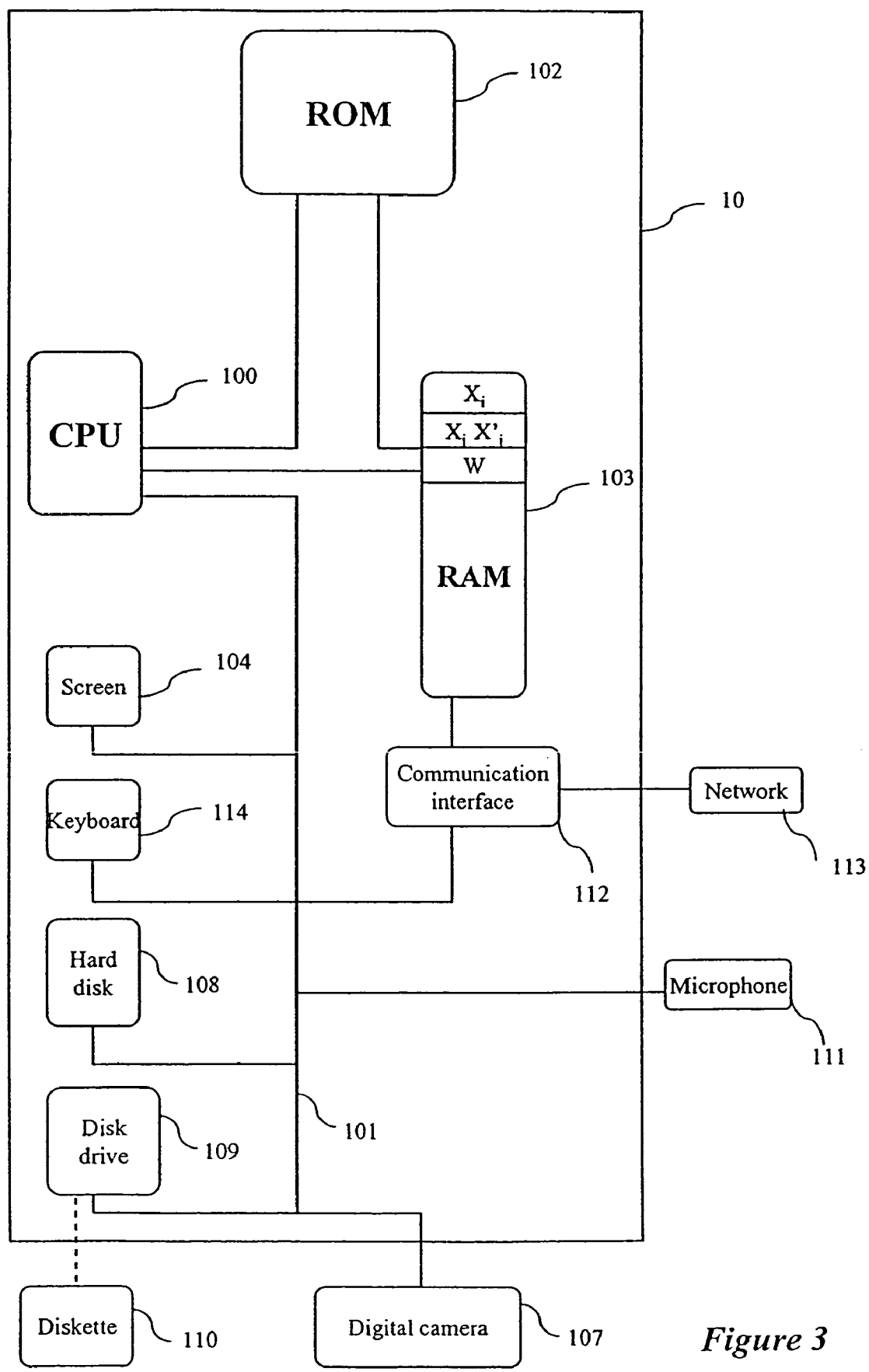
Figure 4:
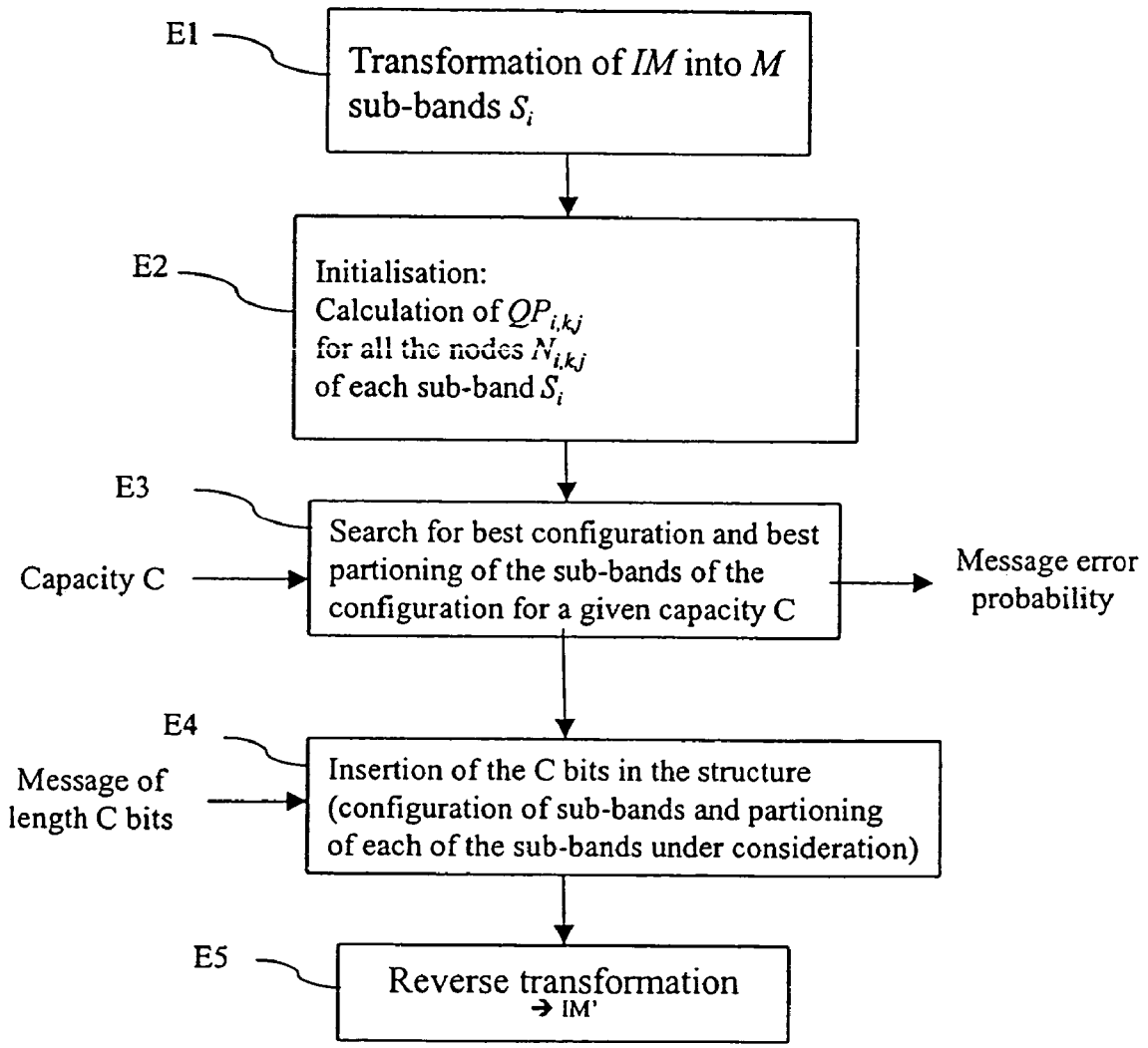
Figure 5:
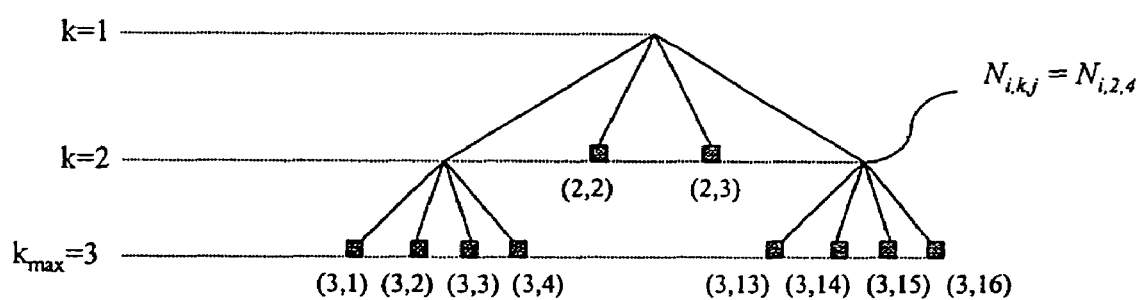
Figure 6:
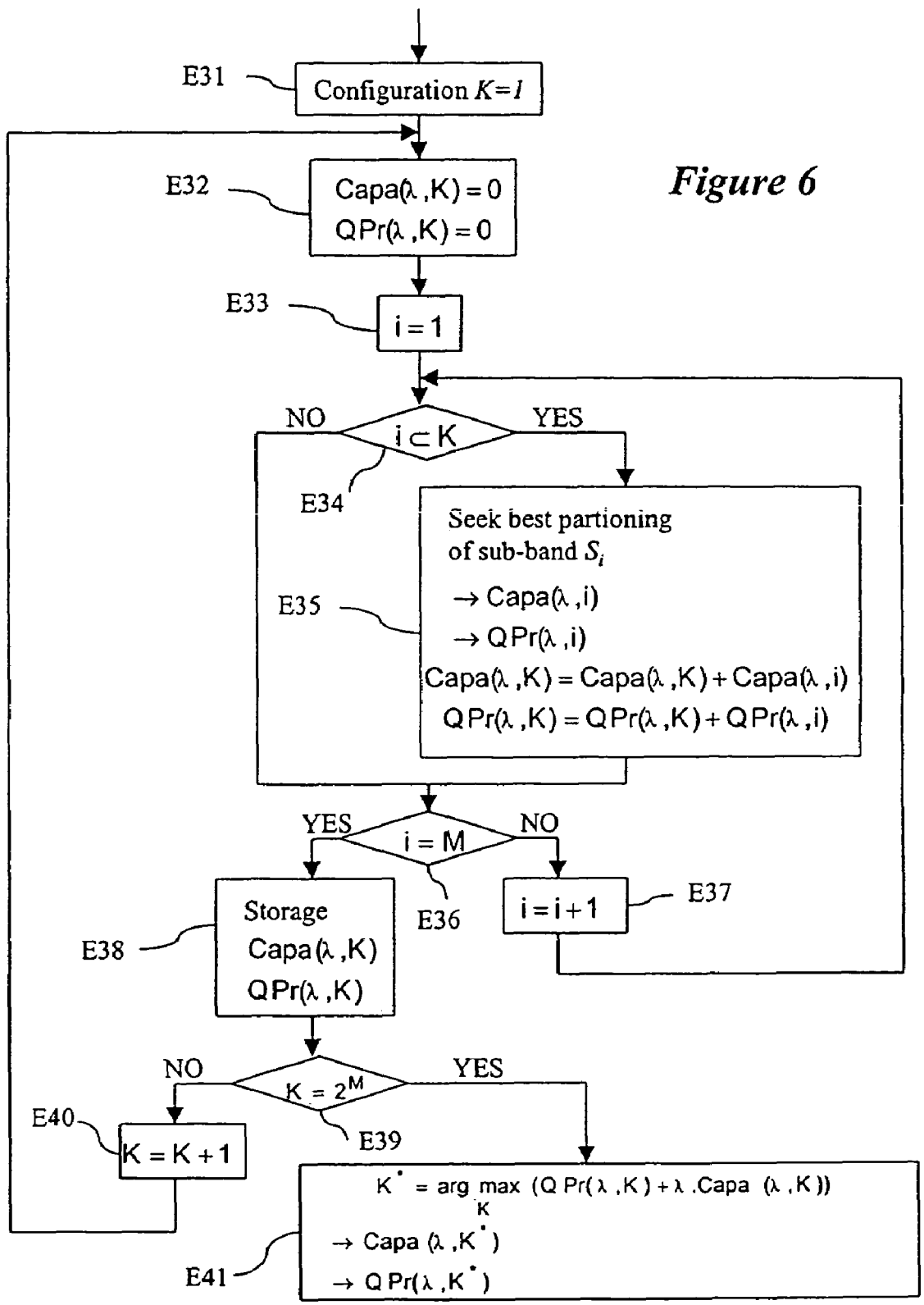
Figure 7:
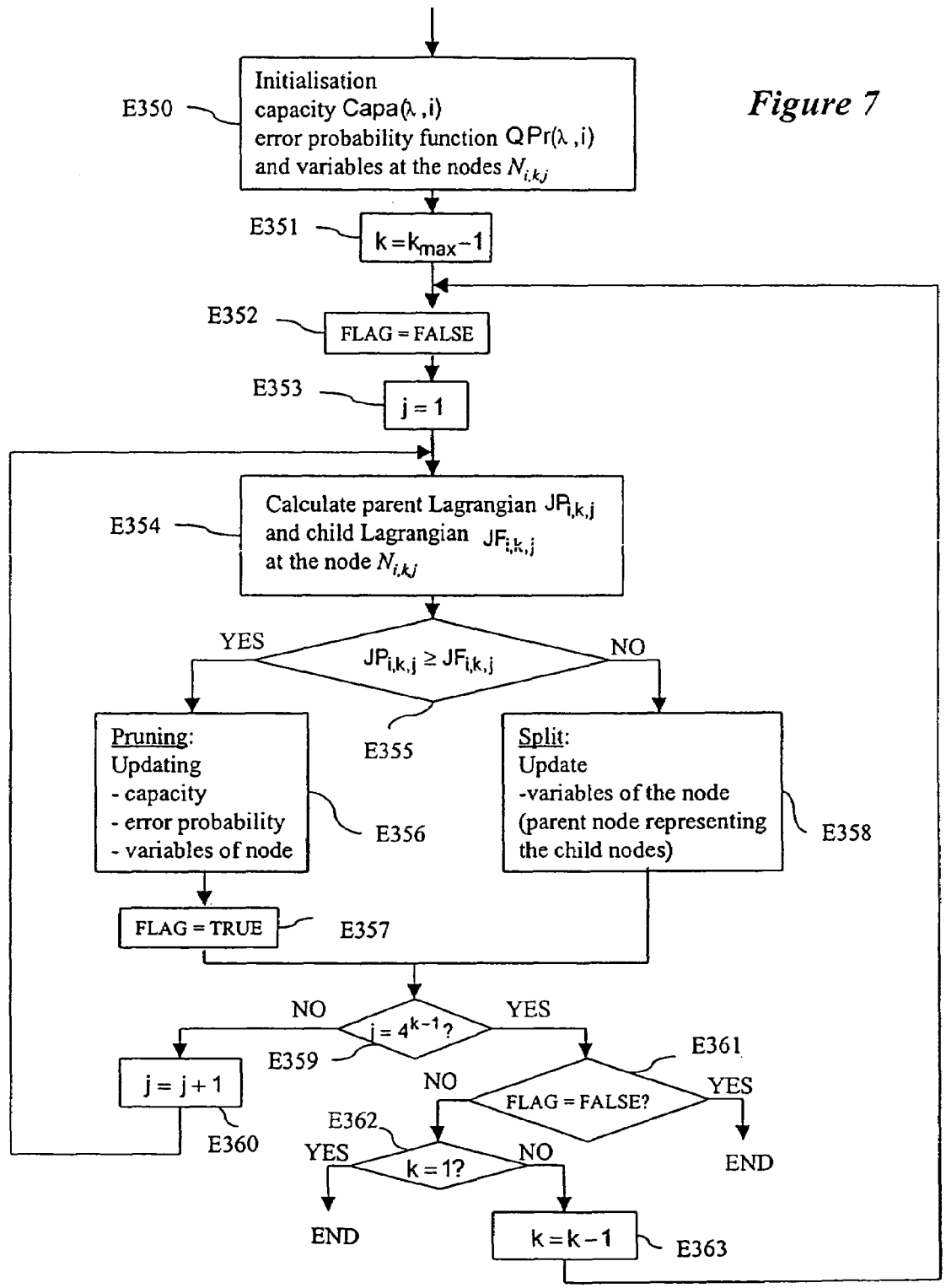
Figure 8:
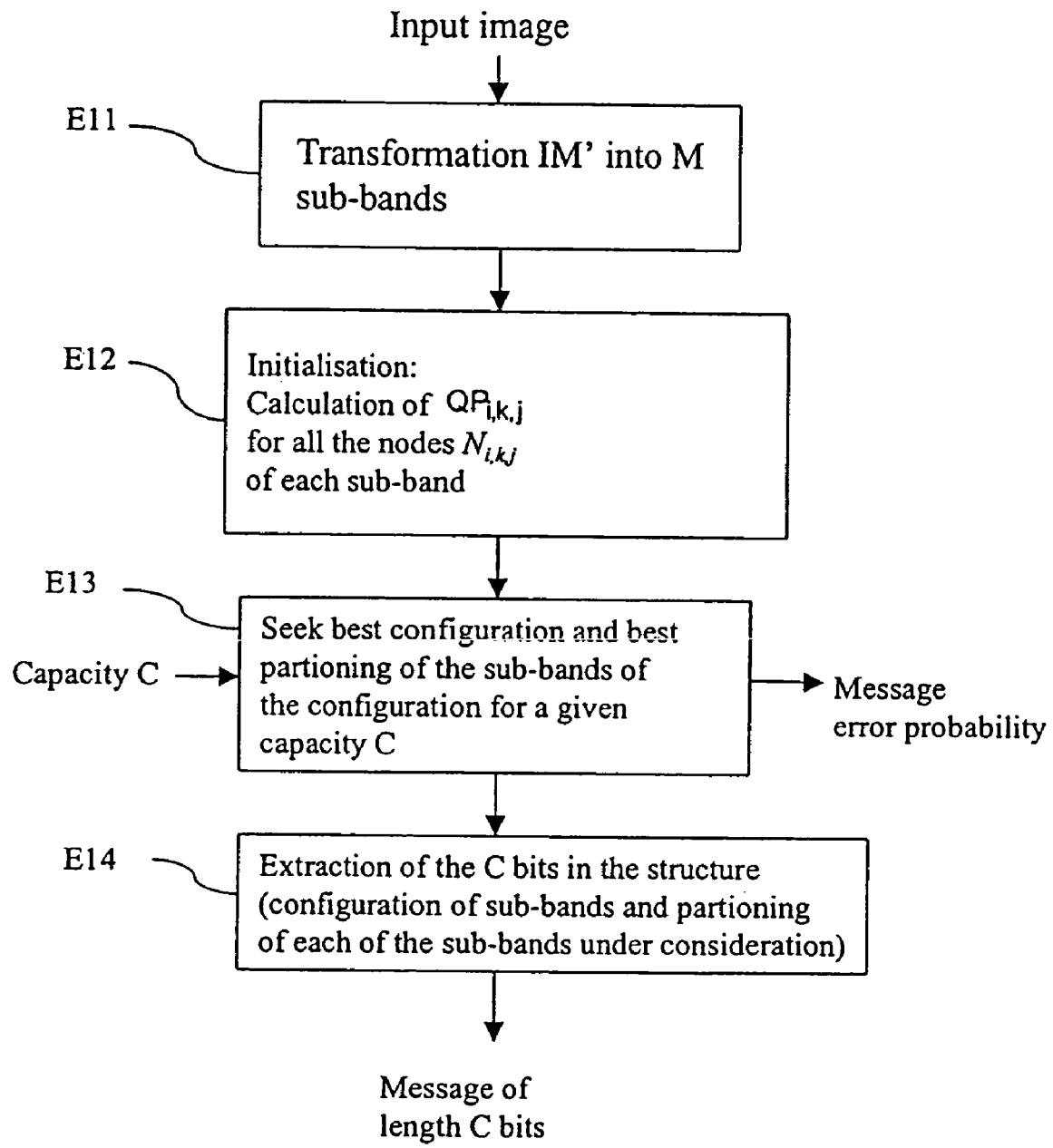
Figure 9:
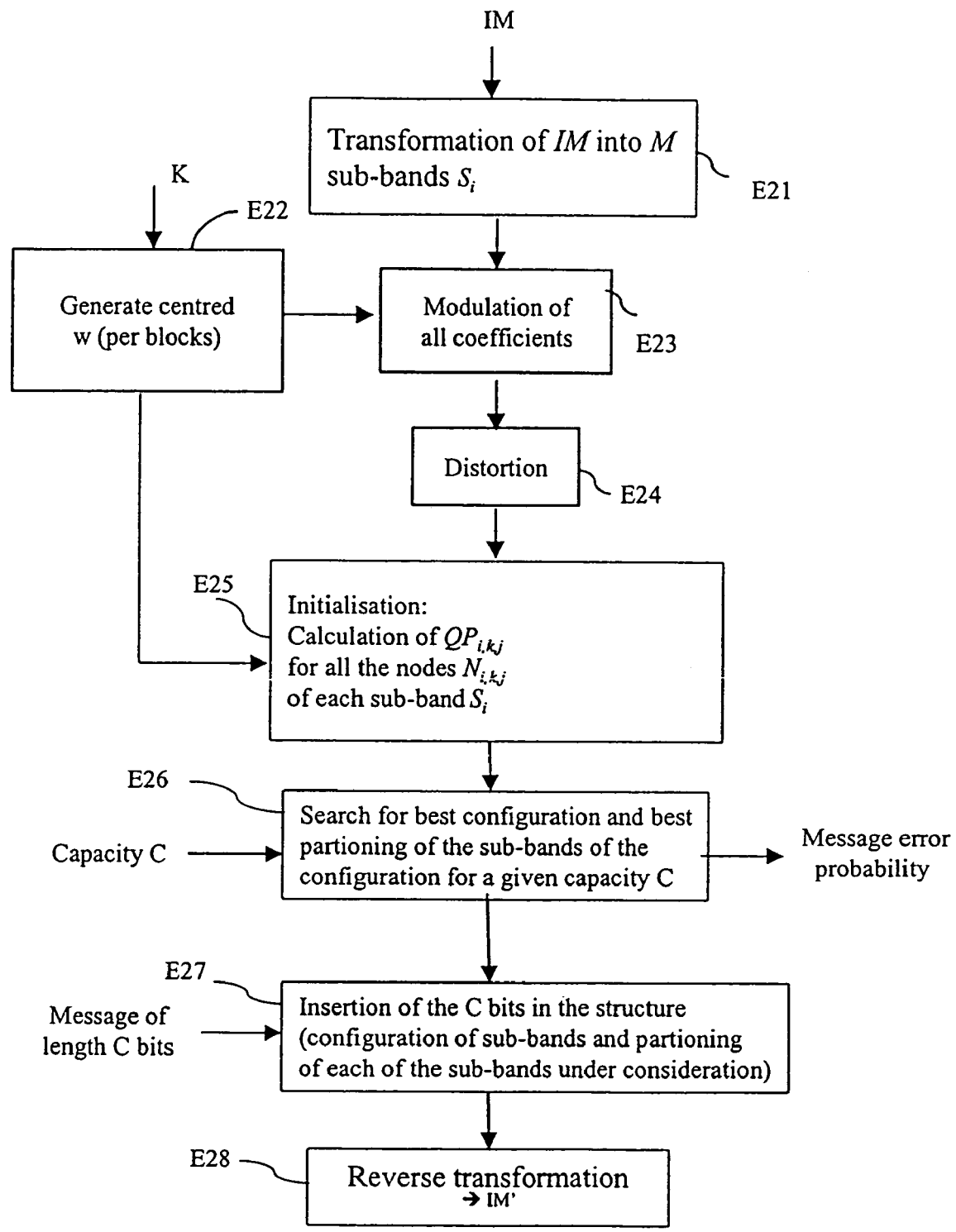
Figure 10:
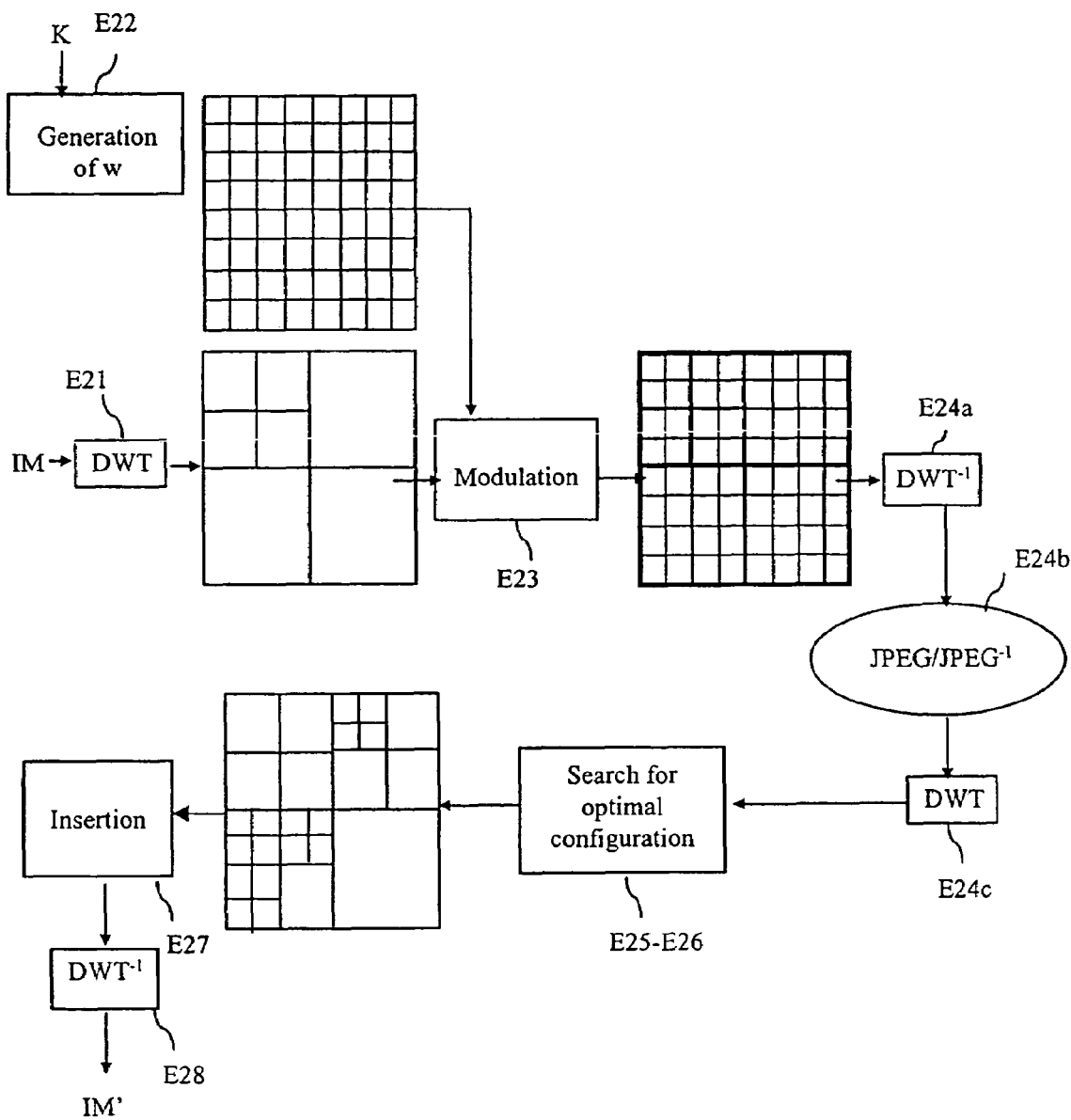

The characteristics and advantages of the present invention will emerge more clearly from a reading of a preferred embodiment illustrated by the accompanying drawings, in which:

FIG. 1 is a general diagram illustrating a device for inserting a watermarking signal in a digital image, FIG. 2 illustrates schematically a spectral decomposition implemented at the time of insertion of a watermarking signal, FIG. 3 is a block diagram illustrating a device adapted to implement the method of determining a partitioning and/or insertion according to the invention, FIG. 4 depicts a first embodiment of the method of determining a partitioning of a digital image and watermarking signal insertion according to the invention, FIG. 5 depicts a frequency sub-band of the digital image and an associated tree segmentation, FIG. 6 depicts an embodiment of a method of seeking a partitioning included in the method of FIG. 4, FIG. 7 depicts the detailed search for a partitioning included in the method of FIG. 6, FIG. 8 depicts an embodiment of a watermarking signal extraction method, FIG. 9 depicts a second embodiment of the method of determining a partitioning of a digital image and watermarking signal insertion according to the invention, FIG. 10 illustrates the second embodiment of the method of determining a partitioning of a digital image and watermarking signal insertion according to the invention.

The chosen embodiment depicted in FIG. 1 is a device for inserting a watermarking signal in a set of coefficients representing a digital image IM.

This digital image IM is stored in a memory 1 and can be represented by a set of coefficients, either in the spatial domain, or in a transformed domain of a space-frequency nature, the coefficients being in the latter case hybrid, that is to say located both in the spatial domain and in the frequency domain. Such a representation of the image is for example obtained by using a sub-band issuing from a spatio-frequency decomposition of the image, for example a discrete wavelet decomposition.

Here the insertion of the watermarking signal is effected by a technique of insertion by spectrum spreading, by modulation of the coefficients of a space-frequency representation of the image, obtained by a spatio-frequency transformation of the digital image IM.

It is possible to use by way of example a discrete wavelet decomposition S depicted schematically in FIG. 2. This spatio-frequency decomposition is well known in the field of image processing and only the principle is set out below. It makes it possible to divide the image into frequency sub-bands and to obtain hybrid coefficients, that is to say spectral coefficients also located in space, here in the plane of the image.

The image IM consists of a series of digital samples. The image IM is for example represented by a series of bytes, each byte value representing a pixel of the image IM, which can be an image with 256 grey levels.

The multi-resolution spectral decomposition means consist of a circuit for decomposition into sub-bands, or analysis circuit, formed by a set of analysis filters, respectively associated with decimators by two. This decomposition circuit filters the image signal IM in two directions, into sub-bands of low spatial frequencies and high spatial frequencies. The circuit has several successive analysis units for decomposing the image IM into sub-bands according to several resolution levels.

By way of example, the image IM is here decomposed into sub-bands with a decomposition level of 3.

A first analysis unit receives the image signal IM and filters it through two digital filters, respectively low-pass and high-pass, in a first direction, for example horizontal. After passing through decimators by two, the resulting filtered signals are in their turn filtered by two filters, respectively low-pass and high-pass, in a second direction, for example vertical. Each signal is once again passed through a decimator by two. There is then obtained at the output of this first analysis unit four sub-bands $LL_1$, $LH_1$, $HL_1$ and $HH_1$ with the highest resolution in the decomposition.

The sub-band $LL_1$ includes the components of low frequency in both directions of the image signal IM. The sub-band $LH_1$ includes the components of low frequency in a first direction and high frequency in a second direction of the image signal IM. The sub-band $HL_1$ includes the components of high frequency in the first direction and the components of low frequency in the second direction. Finally, the sub-band $HH_1$ includes the components of high frequency in both directions.

A second analysis unit in its turn filters the low-frequency sub-band $LL_1$ in order to supply in the same way four sub-bands $LL_2$, $LH_2$, $HL_2$ and $HH_2$ with an intermediate resolution level in the decomposition. A third analysis unit then filters the low-frequency sub-band $LL_2$ in order to supply four sub-bands $LL_3$, $LH_3$, $HL_3$ and $HH_3$ with the lowest resolution in this decomposition.

In this way 10 sub-bands and three resolution levels are obtained. Naturally, the number of resolution levels, and consequently of sub-bands, can be chosen differently.

Naturally other types of spectral transformation can be used such as discrete cosine or sine transformation by blocks, for example. Sub-bands are then formed by grouping together coefficients of transformed blocks with the same spectral index.

In general terms frequency sub-bands are obtained forming a set of space-frequency coefficients in which a watermarking signal can be inserted.

Consideration can thus be given here to one of the sub-bands in order to effect the insertion of a watermarking signal. This sub-band thus supplies a set of coefficients XX, with a size for example of NN.

Let $XX = \{XX_i, 1 \leq i \leq NN\}$ be the set of coefficients representing this sub-band of the digital image IM.

Naturally, a subset of coefficients of this set XX could be considered, representing only part of the sub-band.

In order to insert a watermarking signal in this set of coefficients XX, one technique consists of inserting a pseudo-random signal, spreading its spectrum, in order to make this signal undetectable by spectral or statistical analysis.

Let $w = \{w_j, 1 \leq j \leq P\}$ be a watermarking signal of size $P \leq NN$, a pseudo-random signal with a known distribution and null mean. The most usual distributions are the binary distribution $\{-1, 1\}$, the uniform distribution over $[-1, 1]$ and a centred standardised Gaussian distribution $N(0,1)$.

The insertion formula is:

$$XX'_j = XX_j + b \cdot \alpha_j \cdot w_j, \text{ with } 1 \leq j \leq P,$$

in which $\{XX_j, 1 \leq j \leq P\}$ is a subset of the set of coefficients XX, b is an information bit, and $\alpha_j$ is a weighting coefficient, also referred to as the modulation amplitude. The weighting coefficients $\alpha_j$ are determined so that the change of the signals $XX_j$ into the signals $XX'_j$ is not visible after reconstruction of the image.

The set $S = \{XX_j, 1 \leq j \leq P\}$ is also referred to as the carrier for inserting an information bit.

In order to insert a signal which can be formed by several information bits, it is useful to effect a partitioning of the set of coefficients in order to determine the number of regions, or insertion carriers, available in this set. An information bit will then be inserted in each region. The partitioning is effected in the sub-band under consideration and also in the others sub-bands.

For this, the insertion device 2 according to the invention receives the stored image and has a circuit 11 for segmenting the image into a set of acceptable segmentations. The circuit 11 is connected to a circuit 12 for selecting a segmentation amongst the acceptable segmentations. The functioning of the circuit 12 will be detailed below by means of flow diagrams representing the method used by this circuit.

Preferably, the device has means of displaying a probability of error which will be disclosed below.

The circuit 12 is connected to an insertion circuit 13 which inserts a message of C bits in the segmented image supplied by the circuit 12. The insertion means 13 proper are conventional and make it possible to insert by modulation the different watermarking bits on the different insertion media determined by the circuit 12.

The device 2 is connected to a circuit 3 for using a watermarked image. The circuit 3 depends on the desired application. The functioning of the device 2 will be detailed below by means of algorithms representing the associated method.

It should be noted that a device for extracting a watermarking signal which is inserted in a digital image by the previously described device is similar to the device 2, except for the circuit 13, which is then replaced by an extraction circuit.

The whole of this insertion device 2 can be integrated into a computer 10, or a photographic apparatus, a digital scanner, a digital camera or a communication device.

Such a computer 10 is illustrated in FIG. 3. All the previously stated means of the insertion device 10 are incorporated in a microprocessor 100, a read only memory 102 (ROM) being adapted to store a program for determining a partitioning and inserting a watermarking signal by modulation, and a random access memory 103 (RAM) containing registers adapted to store variables modified during the running of the program.

Naturally, the device for determining a partitioning 11 and the insertion means 12 associated with the reading means 13 could be incorporated in separate computers, similar to the one illustrated in FIG. 3.

The microprocessor 100 integrated into the computer 10 can be connected to different peripherals, for example a digital camera 107 or a microphone 111, in order to receive and store digital documents to be watermarked.

The digital camera 107 makes it possible notably to supply images to be authenticated by inserting a watermarking signal.

This computer 10 has a communication interface 112 connected to a communication network 113 in order to receive any images to be watermarked.

The computer 10 also has document storage means, such as a hard disk 108, or is adapted to cooperate by means of a disk drive 109 with removable document storage means such as disks 110. For example, the disks 110 are diskettes, CD-ROMs or DVD-ROMs.

These storage means, fixed or removable, can also contain the code of the insertion method according to the invention which, once read by the microprocessor 100, will be stored in the hard disk 108.

By way of variant, the program enabling the insertion device to implement the invention can be stored in the read only memory 102.

In a second variant, the program can be received in order to be stored as described previously by means of the communication network 113.

The computer 10 also has a screen 104 making it possible, for example, to serve as an interface with an operator by means of the keyboard 114 or any other means.

The central unit 100 will execute the instructions relating to the implementation of the invention. On powering up, the programs and methods relating to the invention stored in a non-volatile memory, for example the read only memory 102, are transferred into the random access memory 103, which will then contain the executable code of the invention as well as the variables necessary for implementing the invention. This random access memory 103 contains different registers for storing the variables necessary to the running of the program.

A communication bus 101 affords communication between the different sub-elements of the computer 10 or connected to it. The representation of the bus 101 is not limitative, and notably the microprocessor 100 is able to communicate instructions to any sub-element directly or by means of another sub-element.

FIG. 4 depicts a first embodiment of a method of determining a partitioning of a set of data and inserting a watermarking signal in the set of data, according to the invention.

The method according to the invention is implemented in the previously described device and includes steps E1 to E5.

The algorithm for determining a partitioning and inserting a watermarking signal can be stored in whole or in part in any information storage means capable of cooperating with the microprocessor. This storage means can be read by a computer or by a microprocessor. This storage means is integrated or not into the device, and may be removable. For example, it may include a magnetic tape, a diskette or a CD-ROM (fixed-memory compact disc).

The method of determining a partitioning and inserting a watermarking signal is applied to a digital image IM.

This method makes it possible to effect a partitioning of the image into distinct regions, in an adaptive manner, by minimising a probability of error in the detection of a predetermined number of watermarking signals. This probability of error is the probability of making at least one error on a bit in the course of detection of the bits inserted in the image.

Step E1 is the transformation of the image IM into M signals of frequency sub-bands. This transformation is for example performed by a spectral decomposition of the discrete wavelet decomposition type (DWT).

In this way a set of spectral coefficients representing the digital image IM is obtained. These spectral coefficients are distributed in frequency sub-bands as illustrated schematically in FIG. 2. In this example, the image IM is decomposed into ten sub-bands S1 to S10, distributed according to three resolution levels. Naturally, the number of sub-bands and resolution levels can be different.

As a variant, other types of transformation can be used, for example a discrete cosine transformation by blocks.

The segmentation of each of the sub-bands into a quaternary tree is next considered. Each region of the segmentation is associated with a node in the tree. As depicted in FIG. 5, for a given sub-band $S_i$, a node $N_{i,k,j}$ referred to as the parent, gives rise to four so-called child nodes. The quaternary tree has a predetermined depth $k_{max}$, here equal to 3. For a given level of depth k, the nodes are also indexed by a parameter j, whose maximum value $4^{k-1}$ depends on the depth k.

When the quaternary tree includes all the possible nodes at the predetermined depth, it is said to be complete. The tree depicted by way of example in FIG. 5 was obtained by pruning from the complete tree.

The minimisation of the probability of error in the detection of a predetermined number of watermarking signals is equivalent to the maximisation, on all the permissible segmentations, of the expression:

$QP=\Sigma_{1\ to\ CR}(QP_{i,k,j})$, under the constraint that CR is greater than or equal to C. In the previous expression, $QP_{i,k,j}$ denotes the contribution of each of the nodes $N_{i,k,j}$ and will be detailed below, and CR denotes the cardinal of the segmentation of a segmentation under consideration.

The following step E2 is the calculation $QP_{i,k,j}$ of each of the nodes $N_{i,k,j}$ for k varying between 1 and $k_{max}$ and j varying between 1 and $4^{k-1}$, of the quaternary tree structures for all the sub-bands $S_1$, i varying between 1 and M.

The contribution $QP_{i,k,j}$ of a node $N_{i,k,j}$ is equal to log(1-PFA) where PFA is a probability of false alarm for the node under consideration.

The probability of false alarm is a probability of detection error, corresponding to the probability of having decided that there has been an insertion when there had not been an insertion. For this purpose, a standardised hypothesis test is considered, for example the one described in the article "A method for signature casting on digital images" by I. Pitas, I.C.I.P. Proceedings, pages 215 to 218, September 1996.

This standardised hypothesis test is calculated on the region corresponding to the current node $N_{i,k,j}$. In order to calculate this hypothesis test, the insertion described previously is simulated, preferably using a watermarking sequence $w_j$ identical to the sequence which will be used for the insertion proper. The result of the hypothesis test is a variable q which follows a normal law centred on zero and with unity variance, in the case where there has not been any insertion. The test variable q follows a normal law with unity variance and non-null mean when there has been an insertion. For a given variable value q, the probability of false alarm is defined here by a calculation of area under the normal law centred on zero between the abscissae absolute value of q and the infinity.

The following step E3 is the seeking of the best segmentation of the sub-bands in order to insert a number C of watermarking signals. Best segmentation means here a segmentation which maximises the previously defined quantity QP, or in an equivalent fashion minimises the probability of error, on all the acceptable segmentations and under the inequality constraint that the cardinal of the best segmentation is greater than or equal to the cardinal C of all the watermarking signals.

It is a case of an optimisation under constraint, whose Lagrangian formulation is as follows: it is necessary to seek the segmentation R* on all the acceptable segmentations for maximising the expression $\Sigma_{i=1 \text{ to } CR} QP_{i,k,j} + \lambda \cdot CR$, where $\lambda$ is a Lagrange multiplier greater than or equal to zero, relating to the inequality constraint, and CR is the cardinal of the segmentation under consideration.

This amounts to seeking the best quaternary tree which maximises the previous expression for each sub-band. The Lagrangian being separable, it is sufficient to prune the quaternary tree by successively comparing the Lagrangians associated with the parent nodes with the Lagrangians associated with the child nodes, according to an ascending approach, that is to say starting from the deepest level.

For example, the Lagrangian $(QP_{i,2,1}+\lambda)$ of the parent node $N_{i,2,1}$ is compared with the Lagrangian of the child nodes $(QP_{i,3,1}+QP_{i,3,2}+QP_{i,3,3}+QP_{i,3,4}+4\cdot\lambda)$ which is equal to the sum of the elementary Lagrangians. If the Lagrangian of the parent node is greater than that of the child nodes, then the child nodes are pruned. On the other hand, if the Lagrangian of the child nodes is greater than that of the parent node, then the child nodes are kept (an operation of "splitting").

Step E3 consists of successively calling up the algorithm of FIG. 6, which will be described below, for Lagrange multiplier values $\lambda$ chosen by dichotomy until there is convergence to a value $\lambda^*$.

The value $\lambda^*$ is that which makes it possible to have a capacity which approaches as close as possible to the number C of watermarking signals to be inserted. A search by dichotomy is sufficient, since this capacity is a monotonic function of $\lambda$. The optimisation on $\lambda$ stops either at a maximum iteration number criterion, or on a distance criterion of the capacity obtained with the number C.

The result of this step is a segmentation of each of the sub-bands. The segmentations are defined by a set of Boolean values which indicate, for each node, whether or not the node has children.

The following step E4 is the insertion of the C watermarking signals in the segmented image according to the segmentation previously defined. This insertion is conventional and is carried out as described previously. Each watermarking signal, corresponding to a watermarking bit, is inserted in a respective one of the regions of the segmentation.

For this, the sub-bands are processed in a predetermined order, for example by increasing resolution, which makes it possible to insert the first bits with more robustness. For a given sub-band, the regions are also processed in a predetermined order. The same order is used on decoding for finding the inserted bits.

The following step E5 is the transformation which is the reverse of that carried out at step E1, in order to construct the watermarked image IM'.

FIG. 6 depicts a detailed embodiment of the previously described step E3, in the form of an algorithm including steps E31 to E41.

As a result of step E2, the contributions $QP_{i,k,j}$ of all the nodes $N_{i,k,j}$ of the quaternary tree decompositions of all the sub-bands S1 to SM are available.

It is possible to use all the sub-bands of the decomposition in order to insert watermarking data therein, or to select a subset of these sub-bands. The second possibility has the advantage of making it possible to eliminate sub-bands which greatly increase the probability of error when the watermarking signal is extracted. In general terms, such sub-bands are high-energy sub-bands which are, for a "natural" digital image, the low-resolution sub-bands.

It is therefore considered hereinafter that, for an image decomposed into M frequency sub-bands there exist $2^M$ possibilities of selection of sub-bands amongst the M sub-bands, that is to say $2^M$ configurations.

Step E31 is an initialisation for considering a first configuration amongst the $2^M$ possible configurations. The configurations are referenced by a variable K, here set to the value one.

The following step E32 is an initialisation of a capacity $Capa(\lambda, K)$ and of a probability function $QPr(\lambda, K)$ for the current configuration K. These two quantities are here set to zero. The probability function $QPr(\lambda, K)$ is equal to $\log(1-P(K))$, where $P(K)$ is the probability of error in the detection of the message of length $Capa(\lambda, K)$ in the configuration under consideration.

The following step E33 is an initialisation for setting a variable i to 1 in order to consider a first sub-band Si in the decomposition. The sub-bands are considered in an order which can be any order, but predetermined.

The following step E34 is a test for determining whether the current sub-band belongs to the current configuration K.

If the response is positive, then this step is followed by step E35, which is the seeking of the best segmentation of the current sub-band Si. This step will be detailed below. It results in a capacity $Capa(\lambda, i)$ and a probability of error function $QPr(\lambda, i)$ for the current sub-band Si.

The capacity $Capa(\lambda, K)$ and the function of probability of error $QPr(\lambda, K)$ for the current configuration K are respectively equal to the sum of the capacities and to the sum of the functions of the probability of error of all the sub-bands belonging to the configuration K. The value of the capacity $Capa(\lambda, K)$ is updated by addition of the last calculated capacity $Capa(\lambda, i)$ to the current capacity $Capa(\lambda, K)$. Likewise, the probability of error function $QPr(\lambda, K)$ is updated by addition of the last calculated probability of error function $QPr(\lambda, i)$ to the current probability of error function $QPr(\lambda, K)$.

In the case of a negative response at step E34, the latter is followed by step E36, just as step E35 is followed by step E36. Step E36 is a test for determining whether all the sub-bands in the decomposition have been tested.

If the response is negative, then this step is followed by step E37 in order to consider a following sub-band. Step E37 is followed by the previously described step E34.

When the response is positive at step E36, then all the sub-bands of the current configuration have been taken into account. Step E36 is then followed by step E38, which is the storage of the capacity Capa($\lambda$, K) and error probability function QPr($\lambda$, K) values for the current configuration K.

The following step E39 is a test for determining whether all the configurations have been processed. If the response is negative, then this step is followed by step E40 in order to consider a following configuration. Step E40 is followed by the previously described step E32.

When the response is positive at step E39, then all the configurations have been processed, and this step is followed by step E41, at which the configuration K* which supplied the maximum Lagrangian value is determined. There is then available, for the given Lagrange multiplier value $\lambda$, the optimum configuration K*, its capacity Capa($\lambda$, K*) and its error probability function QPr($\lambda$, K*).

It should be stated that step E3 includes the iterative search for the value $\lambda$* which makes it possible to obtain a capacity close to the number C of watermarking signals to be inserted.

At the end of step E3, there is available the value QPr($\lambda$*, K*) which makes it possible to calculate the probability of error: $P=1-e^{QPr(\lambda^*, K^*)}$. This value makes it possible to evaluate the robustness of the insertion and is displayed.

The step E35 of seeking the best segmentation of the current sub-band Si is now detailed with reference to FIG. 7.

This step includes sub-steps E350 to E363.

Step E350 is an initialisation at which all the nodes of the maximum level kmax in the current sub-band are considered. The capacity Capa($\lambda$, i) of the current sub-band Si is initialised to its maximum value, that is to say $4^{kmax-1}$. The error probability function QPr($\lambda$, i) is initialised to a value equal to the sum of the contributions $QP_{i,k,j}$ of the nodes of the level $k_{max}$ of the current sub-band.

For each node, a Boolean variable $B_{i,k,j}$ is also initialised, which depends on the value of the Lagrange multiplier $\lambda$. The Boolean variable indicates that the node has been pruned if it is equal to the value "true", and that it has not been pruned if it is at the value "false". The set of Boolean values of the current sub-band makes it possible to identify the segmentation of this sub-band.

At this step, the values of the Boolean variables are initialised to the value "true" for the nodes of the level $k_{max}$, and to the value "false" for the other levels.

The capacities $Capa_{i,k,j}$ indicating the contribution in numbers of bits of each of the nodes are initialised to one for the nodes of the level $k_{max}$.

Contributions $QPr_{i,j,k}$ indicating the contribution of each of the nodes to the function representing the probability of error QPr($\lambda$) are initialised to the respective values of $QP_{i,k,j}$ for the nodes of the depth $k_{max}$.

The following step E351 is an initialisation for considering the level $k_{max-1}$.

The following step E352 is the initialisation of a Boolean variable FLAG to the value "false". The variable FLAG indicates that there has been at least one pruning decision at the current level if it is at the value "true".

The following step E353 is an initialisation for considering the first node $N_{i,k,1}$ of the current level.

The following step E354 is the calculation of the parent Lagrangian $JP_{i,k,j}$ and of the child Lagrangian $JF_{i,k,j}$ of the current node $N_{i,k,j}$, according to the formulae:

$$JP_{i,k,j}=QP_{i,k,j}+\lambda$$

$JF_{i,k,j}=\Sigma_j(QPr_{i,k+1,j}+\lambda Capa_{i,k+1,j})$, where the sum is effected on all the child nodes of the current node.

The following step E355 is the comparison of the parent Lagrangian $JP_{i,k,j}$ and the child Lagrangian $JF_{i,k,j}$ of the current node $N_{i,k,j}$.

If the parent Lagrangian is greater than the child Lagrangian, then step E355 is followed by step E356, at which the current node is pruned. The following variables are updated:

$$B_{i,k,j}=\text{"True"}$$

$$Capa_{i,k,j}=1$$

$$QPr_{i,k,j}=QP_{i,k,j}$$

$$Capa(\lambda,i)=Capa(\lambda,i)+1-\Sigma_j Capa_{i,k+1,j}$$

$$QPr(\lambda,i)=QPr(\lambda,i)+QP_{i,k,j}-\Sigma_j QPr_{i,k+1,j}$$

Where the sums are effected on the children of the current node $N_{i,k,j}$.

At the following step E357, the variable FLAG is set to the value "true", in order to indicate that the node has been pruned.

If the parent Lagrangian is less than the child Lagrangian, then step E355 is followed by step E358, at which the following variables are updated:

$$Capa_{i,k,j}=\Sigma_j Capa_{i,k+1,j}$$

$$QPr_{i,k,j}=\Sigma_j QPr_{i,k+1,j}$$

Where the sums are effected on the children of the current node $N_{i,k,j}$.

Steps E357 and E358 are followed by step E359, which is a test for checking whether all the nodes of the current level have been processed.

If the response is negative, then this step is followed by step E360 in order to consider a following node. Step E360 is followed by the previously described step E354.

When the response is positive at step E359, then this step is followed by step E361, which is a test for checking whether the value of the variable FLAG is at the value "false".

If the response is positive, this means that no node of the current level has been pruned, and it is judged unnecessary to continue the use of the algorithm for the higher level.

If the response is negative at step E361, then this step is followed by step E362, which is a test for determining whether the current level is level 1. If the response is positive, then all the levels have been processed, and the use of this algorithm is terminated.

If the response is negative at step E362, then this step is followed by step E363, at which the level immediately lower than the current level is considered. This step is followed by the previously described step E352.

With reference to FIG. 8, the method according to the invention of extracting the watermarking signal inserted in the image IM is described.

This method is implemented in the form of an algorithm including steps E11 to E14.

Steps E11 to E13 are respectively similar to steps E1 to E3 previously described, and are effected for an image IM* in which it is sought to extract a message of C bits which has been able to be inserted therein.

It should be noted that, at step E12, the insertion is not simulated for the calculation of the values $QP_{i,k,j}$, since here the image in which it is assumed that the watermarking signals have been inserted is being worked on.

At the end of step E13, there is a segmentation of the image IM* available. The error probability in the detected message is also available. This value gives a measure of the reliability of the detection effected, which is displayed.

The following step E14 is the extraction of the C watermarking bits. This extraction is conventional and includes an examination of the sign of the hypothesis test result q calculated at step E12, on each region of the segmentation obtained at step E13.

FIG. 9 depicts a second embodiment of a method of determining a partitioning of a set of data and inserting a watermarking signal in the set of data, according to the invention.

The method according to the invention is implemented in the previously described device and includes steps E21 to E28.

Steps E21 and E25 to E28 are respectively similar to steps E1 to E5 previously described (FIG. 4). Those steps will not be detailed here.

This method makes it possible to effect a partitioning of the image into distinct regions, in an adaptive manner, by minimising a probability of error in the detection of a predetermined number of watermarking signals. This probability of error is the probability of making at least one error on a bit in the course of detection of the bits inserted in the image.

In this second embodiment the method of determining a partition comprises a step of applying a distortion to the set of modulated coefficients, before the step of calculation of the contribution $QP_{i,k,j}$ of each of the nodes $N_{i,k,k}$. A predetermined distortion is applied to a set of modulated coefficients and to carry out the calculation of the contributions $QP_{i,k,j}$ after this pre-distortion, in such a way that it is possible to guarantee the detection of the watermarking signals inserted on a partition of the coefficients for a predetermined distortion. This pre-distortion can be applied to the set of modulated coefficients, in a single step, and does not need to be reiterated on each node $N_{i,k,j}$ in the partition.

Step E21 is the transformation of the image IM into M signals of frequency sub-bands. This transformation is for example performed by a spectral decomposition of the discrete wavelet decomposition type (DWT).

Step E22 generates a centred pseudo-random sequence w equal in size to the cardinal number of the set of coefficients representative of an image, here equal to N. As will be described in greater detail later, this pseudo-random sequence is formed from centred pseudo-random sub-sequences which are determined by blocks.

Steps E21 and E22 are followed by step E23 which is a modulation of the set of coefficients X by the centred pseudo-random sequence in order to insert the same information bit onto this set of coefficients.

The following step E24 is an application of a distortion D which makes it possible to provide for and guarantee the robustness of the inserted watermark in the case of certain types of distortion, typically a compression of the digital image in order to store it.

This step of applying a distortion make it possible actually to simulate a predetermined distortion over the set of modulated coefficients. Here it comprises, whenever the coefficients of the set X are spectral coefficients, an inverse spectral transformation of the set of coefficients modulated in order to obtain a watermarked image, an application of a distortion to this watermarked image, and a spectral transformation of the watermarked image in order to recover the set of modulated coefficients after distortion.

Step E24 will be detailed in the following.

The following step E25 is the calculation of the contribution $QP_{i,k,j}$ of each of the nodes $N_{i,k,j}$ for k varying between 1 and kmax and j varying between 1 and $4^{k-1}$, of the quaternary tree structures for all the sub-bands $S_i$, i varying between 1 and M.

The following step E26 is the seeking of the best segmentation of the sub-bands in order to insert a number C of watermarking signals.

The result of this step is a segmentation of each of the sub-bands. The segmentations are defined by a set of Boolean values which indicate, for each node, whether or not the node has children.

The following step E27 is the insertion of the C watermarking signals in the segmented image according to the segmentation previously defined. This insertion is conventional and is carried out as described previously. Each watermarking signal, corresponding to a watermarking bit, is inserted in a respective one of the regions of the segmentation processed in a predetermined order. The same order is used on decoding for finding the inserted bits.

FIG. 10 illustrates the method of FIG. 9. A set of spectral coefficients X is obtained, representative of the digital image IM. These spectral coefficients are distributed into frequency sub-bands as illustrated diagrammatically in FIG. 10, on completion of the decomposition stage E21. The size of the set of coefficients X is equal to N=M×M for a square image. Obviously, the same method could be applied to a rectangular image.

In this embodiment of the invention, the method includes a stage E22 of generating a centred pseudo-random sequence of size N equal to the cardinal number N of the set of coefficients X representative of the image IM.

Let $w=\{w_{mn}, 0 \leq m,n \leq M\}$ be this pseudo-random sequence.

This pseudo-random sequence w is formed from centred pseudo-random sub-sequences $W^j$.

The pseudo-random sequence can be seen as the merging of the pseudo-random sub-sequences $w^j$.

Here, the centred pseudo-random sequence w is formed from pseudo-random sub-sequences $W^j$ of identical size A=L×L which corresponds to a block, called unit block, of the set of coefficients X. Here, the size of these unit blocks corresponds to the size of nodes $N_{i,k,j}$ for $k=k_{max}$ with a minimum number of coefficients. Obviously, the pseudo-random sub-sequences $w^j$ could differ in size from one another. This characteristic is particularly advantageous in a quaternary tree structure when partition is achieved by combining blocks from an initial segmentation of the image into unit blocks of size L×L. The complete tree then corresponds to the maximum partition of the image made of nodes of size L×L.

For example, L=8 is chosen.

The pseudo-random sequence w is then the merging of N/64 pseudo-random sub-sequences $w^j$ forming unit blocks.

On each unit block, in accordance with the invention, a centred pseudo-random signal of predefined distribution (Gaussian, uniform, etc.) has to be generated on the basis of a function depending on a secret key K on the subband i and on the index j of each unit block. This key can be denoted f(K,i, j). It is then necessary to ensure that, in practice, the average of the signal $W^j$ is exactly equal to zero over each unit block.

A first method for generating such a centred pseudo-random sequence consists in centring the sequence in a deterministic way, by symmetrisation. This method is suitable for generating a pseudo-random sub-sequence of even size A.

In this case, each centred pseudo-random sub-sequence $w^j$ is created by generating one half, A/2, of the pseudo-random samples of the sub-sequence via a pseudo-random number generator of known centred distribution, and by symmetrising the pseudo-random samples thus generated in order to obtain the other half A/2 of the samples of the sub-sequence $w^j$.

For a single-dimensional sequence, a set of samples of size A/2 $\{w_I, 1 \leq I \leq A/2\}$ is therefore generated, and this set is made symmetric in order to obtain the other half of the samples $\{w_I = -w_{A-I}, A/2 \leq I \leq A\}$.

In order to reinforce the random character of the sequence thus obtained, permutation can be carried out on the set of samples obtained $\{w_I, 1 \leq I \leq A\}$ by using a secret key.

A second method of generating a centred pseudo-random sequence consists in creating each centred pseudo-random sub-sequence $w^j$ by generating pseudo-random samples via a pseudo-random number generator and by redistributing the sum of these pseudo-random samples generated over each sample.

Thus, first of all, by using the secret key f(k,i,j), a sequence of pseudo-random samples of the same size A as the unit block, i.e. $\{w_I, 1 \leq I \leq A\}$, is generated.

Next the exact sum of these samples is calculated:

$$SS_j = \sum_{i=1}^{A} w_I$$

Then this sum $SS_j$ is redistributed over the samples so as to obtain a centred pseudo-random sequence, that is to say one with a sum exactly equal to zero.

Thus $w^j = \{w_I - SS_j/A, 1 \leq I \leq A\}$ is obtained.

The pseudo-random sequence w is thus composed of the merging of the centred sub-sequences $W^j$ in such a way that the partitioning of a set of coefficients modulated by the centred pseudo-random sequence w gives rise to subsets of coefficients also modulated by centred pseudo-random sub-sequences.

Obviously, other techniques could be used to generate centred pseudo-random sequences.

As illustrated in FIG. 10, the step E23 of modulation of the set of coefficients by the centred pseudo-random sequence w is then implemented so as to insert an information bit onto the set of coefficients originating from the spectral decomposition.

In practice, the set of coefficients is copied into a working memory, for example the random-access memory 103 in FIG. 3, so as not to mark the image I directly.

The same information bit is modulated onto the set of coefficients, for example b=1 here, according to the modulation formula:

$X'_i = X_i + \alpha_i w_i$, with $0 \leq i \leq N$.

The weighting amplitude $\alpha_i$ is chosen in the usual way so as to guarantee invisibility of the inserted information bit.

A constant weighting coefficient can be used for all the coefficients, such that $\alpha_i = \alpha_v$ for all i, the value of the weighting coefficient $\alpha_v$ being equal to a maximum value ensuring imperceptibility of the watermark for modulation of the set of coefficients representative of the digital image.

It may be worthwhile exploiting the fact that the image signal itself makes it possible to mask the modulation.

To this end, it is possible, for each coefficient $X_i$ to be modulated, to use a weighting coefficient according to a rule of the form $\alpha_i = k_i . \alpha_v$, where $k_i$ is a modulation factor depending on the coefficients situated in the vicinity of the coefficient in question and $\alpha_v$ is equal to the maximum value of the weighting coefficient ensuring imperceptibility of the watermark for the modulation of the set of coefficients.

Thus, each coefficient will be modulated as a function of the local content of the image, which makes it possible locally to augment the amplitude of the modulation to the benefit of the detectability.

For preference, in this embodiment of the invention, it is wished to apply a partitioning to a post-processed image signal so as to obtain robustness, a priori of the inserted watermark, against some post-processing undergone by the image IM.

To do that, a distortion is applied, in the distortion step E24, to the set of modulated coefficients.

By virtue of the modulation of the coefficients in a single operation, on the basis of a centred pseudo-random sequence, the distortion step E24 can be implemented once only upon determination of a partition, in contrast to the techniques in which each sub-region of coefficients is modulated independently of the other and requires distortion to be applied to each level of the partition.

This is all the more advantageous since, here, the step E24 of applying a distortion includes the following sub-steps as illustrated in FIG. 10:

inverse spectral transformation E24a of the set of coefficients $X'_i$ modulated in order to obtain a watermarked image;

application proper, E24b, of distortion to the watermarked image; and spectral transformation E24c of the watermarked image in order to obtain a set of modulated coefficients after distortion.

The distortions applied are distortions which alter the value of the pixels without altering the geometry of the image, such as the addition of noise, alteration of the contrast, compression, low-pass or high-pass filtering, for example.

Compression of the image is considered here, according to the JPEG standard (for Joint Photographic Expert Group) with specified quality factor Q, with Q=75 typically by default for JPEG compression.

In practice, an inverse sub-band transformation, e.g. a wavelet transformation $DWT^{-1}$ is applied here, then compression followed by decompression of the image, and finally forward wavelet transformation again.

As previously stated, step E25 is the calculation of the contribution $QP_{i,j,k,j}$ of each of the nodes $N_{i,j,k,j}$. This calculation is made with pseudo-random sequences of support $N_{i,j,k}$ which are the merging of pseudo random sub-sequences corresponding to related unit blocks of support $N_{i,kmax,j}$.

Steps E27 and E28 have been previously described.

Naturally, the present invention is in no way limited to the embodiments described and depicted, but quite the contrary encompasses any variant within the capability of a person skilled in the art.

In particular, it is possible to insert the set of watermarking signals in the original pixel domain, without any transformation in sub-band.

In particular, when a transformation in sub-band is effected, it is possible to determine a priori the sub-bands used for the insertion, for example by eliminating the high-energy sub-bands.

It is also possible to use another detection error measurement. This measurement will preferably result in a formulation separable from the problem of optimisation under constraint, so as to be able to use the same type of algorithm on a quaternary tree structure.

It is also possible to use any other type of arborescent segmentation.

It is also possible to insert; in a digital image, watermarking data made of a plurality of bits, the insertion comprising the steps of:
independently embedding each of the plurality of bits into distinct regions forming part of the digital image, and
determining the distinct regions so that each of the distinct regions satisfies a predetermined bit-detecting criterion.

It is also possible to insert, in a digital image, watermarking data made of a plurality of bits, the insertion comprising the steps of:
independently embedding each of the plurality of bits into distinct regions forming part of the digital image, and
determining the distinct regions so that each size of the distinct regions satisfies a predetermined bit-detecting criterion.

The invention claimed is:

1. A method of determining a segmentation into distinct regions of a set of coefficients representing at least part of an image in order to insert or extract a set of watermarking signals with a predetermined cardinal, comprising the steps of:
generating a set of acceptable segmentations;
calculating, for each acceptable segmentation, a probability of error on the detection of the watermarking signals inserted in said each acceptable segmentation; and
selecting at least a segmentation in the set of acceptable segmentations, on consideration of the probability of error subject to a constraint on the number of regions of the selected segmentation, with respect to said predetermined cardinal.

2. The method according to claim 1, wherein said set of coefficients is a set of transformed coefficients issuing from a spatial-frequency transformation of a digital image.

3. The method according to one of claims 1, wherein the acceptable segmentations are obtained by arborescent segmentation of the set of coefficients representing at least part of an image.

4. The method according to claims 1, wherein the acceptable segmentations are obtained by quaternary tree segmentation of all the coefficients representing at least part of an image.

5. The method according to claim 1, wherein each of the watermarking signals is associated with a watermarking bit and in that the probability of error on the detection of the watermarking signals is the probability of making at least one error on a bit during the detection of the watermarking bits.

6. The method according to claim 1, comprising a step of applying a distortion to the set of coefficients, before the step of generating a set of acceptable segmentations.

7. The method according to claim 6, further comprising the steps of:
generation of a centered pseudo-random sequence equal in size to the cardinal number of the set of coefficients, formed from centered pseudo-random sub-sequences;
modulation of the set of coefficients by the centered pseudo-random sequence in order to insert the same information bit on the said set of coefficients; and
applying a distortion to the set of coefficients, before the step of generating a set of acceptable segmentations.

8. The method according to claim 1, further comprising displaying of the probability of error on all the watermarking signals.

9. A method of inserting, in a digital image, watermarking signals respectively associated with watermarking bits, comprising:
a method of determining a segmentation according to claim 1; and
a step of inserting the watermarking bits by modulation of the coefficients of respective regions of the segmentation.

10. A method of extracting, from a digital image, watermarking signals respectively associated with watermarking bits, comprising:
a method of determining a segmentation according to claim 1; and
a step of extracting the watermarking bits.

11. A device for determining a segmentation into distinct regions of a set of coefficients representing at least part of an image in order to insert a set of watermarking signals with a predetermined cardinal, comprising:
generating means for generating a set of acceptable segmentations;
calculating means for calculating, for each acceptable segmentation, a probability of error on the detection of the watermarking signals inserted in said each acceptable segmentation; and
selecting means for selecting a segmentation in the set of acceptable segmentations, on consideration of the probability of error subject to a constraint on the number of regions of the selected segmentation, with respect to said predetermined cardinal.

12. The device according to claim 11, wherein the device is adapted to consider a set of coefficients which is a set of transformed coefficients issuing from a spatial-frequency transformation of a digital image.

13. The device according to claim 11, wherein the generation means is adapted to determine the acceptable segmentations by arborescent segmentation of all the coefficients representing at least part of an image.

14. The device according to claim 11, wherein the generation means is adapted to determine the permissible segmentations by quaternary tree segmentation of all the coefficients representing at least part of an image.

15. The device according to claim 11, wherein the device is adapted to associate a watermarking bit with each of the watermarking signals and in that the calculation means is adapted to consider the probability of error on the detection of the watermarking signals as the probability of making at least one error on a bit during the detection of the watermarking bits.

16. The device according to claim 11, further comprising means for applying a distortion to the set of coefficients.

17. The device according to claim 16, further comprising:
means for generating a centered pseudo-random sequence equal in size to the cardinal number of the set of coefficients, formed from centered pseudo-random sub-sequences;

means for modulating of the set of coefficients by the centered pseudo-random sequence in order to insert the same information bit on the set of coefficients; and means for applying a distortion to the set of coefficients.

18. The device according to claim 16, further comprising means for displaying the probability of error on all the watermarking signals.

19. A device for inserting, in a digital image, watermarking signals respectively associated with watermarking bits, comprising:

a device for determining a segmentation according to claim 16; and means for inserting watermarking bits by modulation of the coefficients of respective regions of the segmentation.

20. A device for extracting, from a digital image, watermarking signals respectively associated with watermarking bits, comprising:

a device for determining a segmentation according to claim 16; and means for extracting the watermarking bits.

* * * * *

UNITED STATES PATENT AND TRADEMARK OFFICE
CERTIFICATE OF CORRECTION

PATENT NO. : 7,283,643 B2  
APPLICATION NO. : 10/919360  
DATED : October 16, 2007  
INVENTOR(S) : Nguyen Page 1 of 1

It is certified that error appears in the above-identified patent and that said Letters Patent is hereby corrected as shown below:

COLUMN 1:  
Line 23, "metadata" should read -- metadata. --.

COLUMN 3:  
Line 20, "modulation)" should read -- modulation --.

COLUMN 6:  
Line 44, "others" should read -- other --.

COLUMN 16:  
Line 56, "$N_{i,j,k,j}$." should read -- $N_{i,j,k}$ --.

COLUMN 17:  
Line 46, "one of claims 1," should read -- claim 1 --; and  
Line 50, "claims 1," should read -- claim 1 --.

COLUMN 19:  
Line 12, "claim 16," should read -- claim 11, --; and  
Line 20, "claim 16," should read -- claim 11, --.

COLUMN 20:  
Line 8, "claim 16," should read -- claim 11; --.

Signed and Sealed this

Tenth Day of June, 2008

JON W. DUDAS  
*Director of the United States Patent and Trademark Office*